US007483969B2

(12) United States Patent
Chavda et al.

(10) Patent No.: US 7,483,969 B2
(45) Date of Patent: Jan. 27, 2009

(54) MANAGING PRESENCE BASED ON RELATIONSHIP

(75) Inventors: Ankur Chavda, Seattle, WA (US); Justin M. Maguire, Seattle, WA (US); Sira P. Rao, Bellevue, WA (US); Setty Venkateshaiah, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 127 days.

(21) Appl. No.: 11/539,848

(22) Filed: Oct. 9, 2006

(65) Prior Publication Data

US 2008/0086531 A1  Apr. 10, 2008

(51) Int. Cl.
  G06F 15/16 (2006.01)
  G06F 12/00 (2006.01)
(52) U.S. Cl. ...................... 709/223; 709/203
(58) Field of Classification Search .......... 709/203, 709/206, 207, 224, 226
  See application file for complete search history.

(56) References Cited

U.S. PATENT DOCUMENTS

| | | | |
|---|---|---|---|
| 6,519,629 | B2 | 2/2003 | Harvey et al. |
| 6,968,179 | B1 | 11/2005 | De Vries |
| 7,035,923 | B1* | 4/2006 | Yoakum et al. ............. 709/224 |
| 7,069,259 | B2 | 6/2006 | Horviiz et al. |
| 2002/0021307 | A1 | 2/2002 | Glenn et al. |
| 2004/0143633 | A1 | 7/2004 | McCarty |
| 2004/0153506 | A1* | 8/2004 | Ito et al. ..................... 709/204 |
| 2004/0154022 | A1 | 8/2004 | Boss et al. |
| 2004/0158609 | A1 | 8/2004 | Daniell et al. |
| 2004/0250212 | A1 | 12/2004 | Fish |
| 2004/0254998 | A1 | 12/2004 | Horvitz |
| 2004/0267887 | A1 | 12/2004 | Berger et al. |
| 2005/0084082 | A1 | 4/2005 | Horvitz et al. |
| 2005/0170847 | A1 | 8/2005 | Karlsson et al. |
| 2005/0171832 | A1* | 8/2005 | Hull et al. ...................... 705/10 |
| 2005/0171954 | A1 | 8/2005 | Hull et al. |
| 2005/0198031 | A1* | 9/2005 | Pezaris et al. .................. 707/9 |
| 2005/0210104 | A1 | 9/2005 | Torvinen |
| 2005/0218206 | A1 | 10/2005 | Ohno et al. |
| 2006/0015609 | A1* | 1/2006 | Hagale et al. ............... 709/224 |
| 2006/0031510 | A1 | 2/2006 | Beck et al. |
| 2006/0031772 | A1 | 2/2006 | Valeski |
| 2006/0036688 | A1 | 2/2006 | McMahan et al. |
| 2006/0099911 | A1 | 5/2006 | Shibuya |

(Continued)

OTHER PUBLICATIONS

U.S. Appl. No. 11/553,135, Chavda et al.

(Continued)

Primary Examiner—Zarni Maung
(74) Attorney, Agent, or Firm—Perkins Coie LLP

(57) ABSTRACT

A system and method for managing presence information based on a specified presence level between a user and other parties. An interface is provided that allows a user to specify a presence level between the user and one or more other parties. Once a user specifies a presence level, the specified level dictates how an incoming communication request is to be managed in the event that the user is not available to receive the communication. The specified presence level may determine the amount of information disclosed to the other party, the presence that is projected to the other party, and the decision on whether to interrupt the user. In some embodiments, the presence level between the user and other parties is automatically inferred by a relationship engine.

19 Claims, 6 Drawing Sheets

U.S. PATENT DOCUMENTS

2006/0190117 A1* 8/2006 Weczorek et al. ............ 700/103
2007/0255683 A1* 11/2007 Cox ............................. 707/2

OTHER PUBLICATIONS

"Developing IM Applications and Bois for Business," Extending the value of instant messaging, an Akonix whitepaper, IM in Control, © 2006 Akonix Systems, Inc.

Day, M., Rosenberg, J. and H. Sugano, "A Model for Presence and Instant Messaging," Feb. 2000, Network Working Group, RFC: 2778, Informational, © The Internet Society 2000.

Eisenstadt, Marc, Jirt Komzak and Martin Dzbor, "Instant messaging →maps = powerful collaboration tools for distance learning." Proceedings of TelEduc03, Havana. Cuba, May 19-21, 2003.

Fisher, Danyel, "Social Networks for End Users," Aug. 2003. Survey Paper. University of California, Irvine, 19 pages.

Fogarty, James, Jennifer Lai and Jim Christensen. "Presence versus Availability: The Design and Evaluation of a Context-Aware Communication Client," 2000, http://interruptions net/literature/Fogarty-IJHC504 pdf.

Jachner, J. et al., "Rich Presence: A New User Communications Experience," Technology White Paper, User-Centric Conferencing and Collaboration, Alcatel Telecommunications Review, 1st Quarter 2005. © Mar. 2005 Alcatel.

Nardi, Bonnie A., Steve Whittaker and Erin Bradner, "Interaction and Outeraction: Instant Messaging in Action," CSCWO0, Dec. 2-6, 2000, Philadelphia, PA. pp. 79-88, © 2000 ACM.

Rosenberg, J., "A Presence Event Package for the Session initiation Protocol (SIP)," Aug. 2004, Network Working Group, RFC: 3856, Standards Track, © The internet Society 2004.

Tang, John C. and Begole, James 'Bo', "Beyond instant Messaging," QUEUE, Nov. 2003, pp. 29-37, © 2003 ACM.

Vogiazou, Yanna, "Wireless Presence and instant Messaging," Nov. 2002, TSW Feb. 2007, KMI Institute, The Open University, © JISC 2002, 21 pages.

* cited by examiner

MANAGING PRESENCE BASED ON RELATIONSHIP

BACKGROUND

Users of computing devices (e.g., laptops, cellular phones, and personal digital assistants) often need to communicate in real time. A common form of real-time communications is provided by instant messaging services. An instant messaging service allows participants at endpoints to send messages and have them received within a second or two by the other participants in a conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

When an initiating participant wants to start a real-time conversation, that participant needs to know whether the intended participants are available to respond in real time to a message. If not, then communications via conventional electronic mail, voice mail, or some other mechanism may be more appropriate. For example, if the computers of the intended participants are currently powered off, then a real-time conversation may not be possible. Moreover, if their computers are currently powered on, but the intended participants are away from their computers, a real-time conversation is also not possible. The initiating participant would like to know the availability of the intended participants so that an appropriate decision on the form of communication can be made.

Presence services provide this availability information. The availability status of an entity such as a computer system or a user associated with that computer system is referred to as "presence information." presence information identifies the current "presence state" of the user. Users make their presence information available to a presence service so that other parties can decide how best to communicate with them. For example, the presence information may indicate whether a user is logged on ("online") with an instant messaging server or is logged off ("offline"). Presence information may also provide more detailed information about the availability of the user. For example, even though a user is online, that user may be away from their computer in a meeting. In such a case, the presence state may indicate "online" and "in a meeting."

One of the challenges in providing presence information to other parties is that not all parties should be shown the same presence information. For example, a user may desire to treat incoming communication from a family member differently than they would from a person that they manage. Prior systems that have tried to solve this problem have attempted to do so by providing the user with a robust set of rules that they can use to specify how individual communication requests should be managed. For example, U.S. Application Publication No. 2006/0015609 entitled "Automatically Inferring and Updating an Availability Status of a User" describes a system wherein a user may define a complex set of rules to handle incoming communications. The user is able to define how each communication is to be managed by specifying various actions that are to be taken (i.e., an availability status that is to be displayed to the contacting party, an interrupt status that is to be conveyed to the user) when various conditions are met (i.e., an activity that the user is participating in when the communication is received, an indication from whom the communication is received). While such a system provides great flexibility to the user, it does so at the expense of usability. Most users are overwhelmed when offered such a large variety of choices, and few users are able to maintain their rule set in order to take full advantage of the system. As a result, it would therefore be beneficial if a simple and easy-to-use presence system were available for users in order to make the system more useful to the user and to those receiving presence information.

SUMMARY

A method and system for enabling a user to manage presence information based on relationships with other parties is provided. Rather than requiring the user to manage a complex set of rules pertaining to how presence information is conveyed to other parties, a simplified interface is provided that allows a user to specify a relationship (or "presence level") between the user and another party or parties. The types of relationships that can be specified may include, but not be limited to, "personal," "coworker," "workplace," "public," or "block" (i.e., no relationship). Once a user specifies a relationship with another party or parties, the specified relationship dictates how an incoming communication request is to be managed in the event that the user is not available to receive the communication. The amount of information disclosed to the other party, the presence that is projected to the other party, and the decision on whether to interrupt the user may be based on the specified relationship. By simplifying the rules under which a user manages their presence information, the user is able to more easily provide accurate and useful presence information to other parties.

In some embodiments, the relationship between the user and another party or parties is defined by the user. A simple interface is provided that allows the user to manually specify the desired relationship in a variety of different applications. In some embodiments, the relationship between the user and another party or parties is automatically inferred by a relationship engine. The relationship engine may infer a relationship between a user and another party or parties based on a variety of information sources including, but not limited to, an e-mail address of the incoming communication request, a prior history of communication between the user and the other party or parties, a social network between the user and the other party or parties, corporate documentation such as organization charts or project rosters, and any other information that may explicitly or implicitly imply a connection between the user and other parties.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
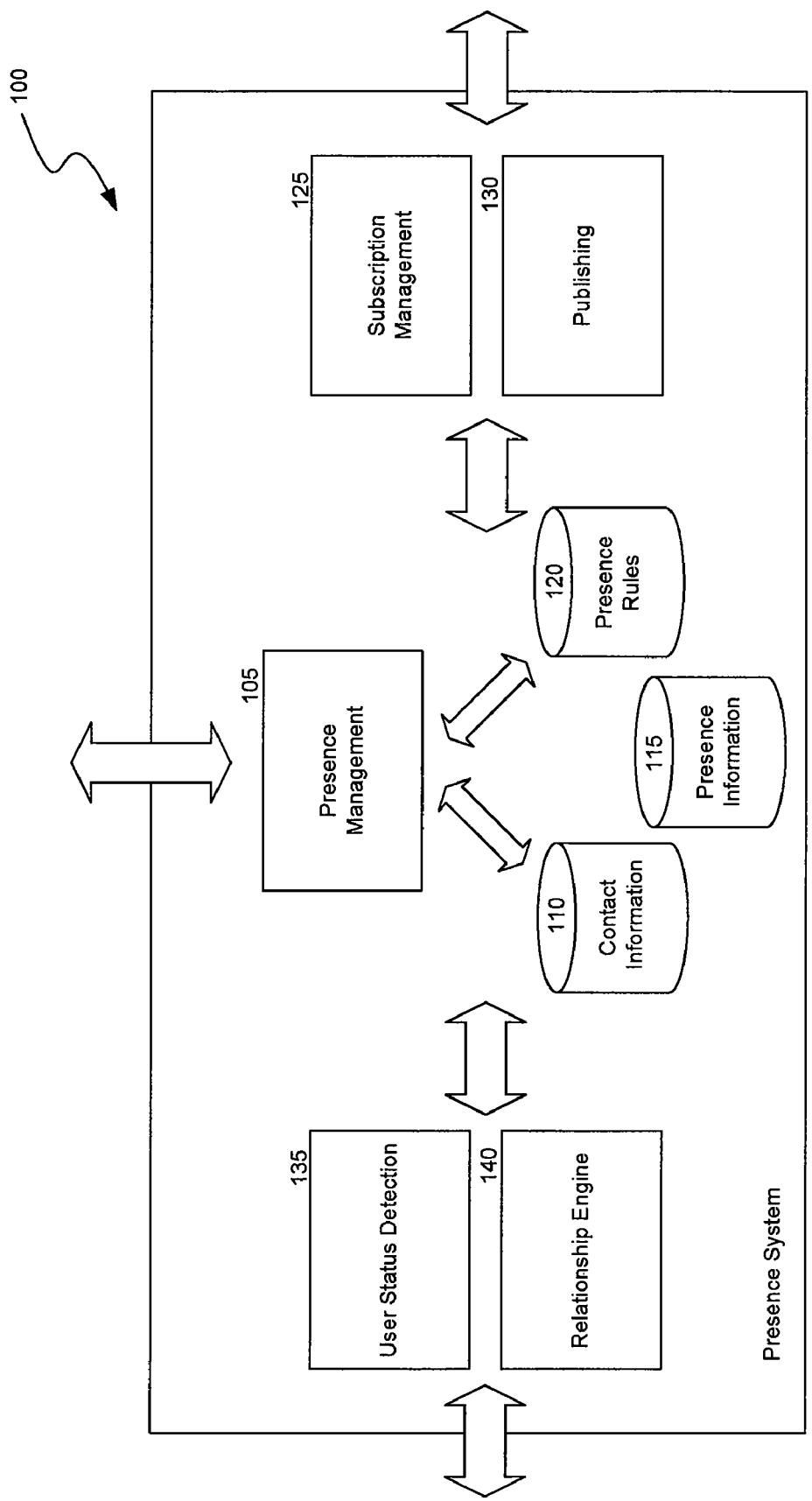
FIG. 1 is a block diagram that illustrates the components of a presence system that enables a user to manage presence levels associated with a party or parties.

FIG. 1 is a block diagram that illustrates the components of a presence system 100 that enables a user to specify and manage presence levels associated with one or more parties. The specified presence levels are used to control how an incoming communication request is to be managed in the event that the user is not available or unwilling to receive the communication. The presence system comprises a presence management component 105 that is coupled to a contact information datastore 110, a presence information datastore 115, and a presence rules datastore 120. As will be described in greater detail herein, the presence management component allows a user to specify and manage presence levels associated with one or more parties. The presence management component receives various inputs to maintain the currency of the presence levels, and provides various outputs to enable other services or applications to utilize the presence level.

The presence management component may use one or more data storage areas to manage the presence levels. The contact information datastore 110 contains a list of parties that are considered to be a "contact" of the user. Such a list is often associated with a user's "contacts" or "address book" in an online or offline instant messaging, email, or calendaring application. The presence information datastore 115 contains a mapping of express or implied presence levels between the user and a party or parties. Presence levels may be stored for contacts that are in a user's contact information datastore 110, as well as presence levels for other parties that are not in the user's contact information datastore. The presence rules datastore 120 contains a set of rules that are applied by the system to determine how an incoming communication request is to be managed in the event that the user is not available to receive the communication. The amount of information disclosed to the other party, the presence that is projected to the other party, and the decision on whether to interrupt the user when the communication request is received is all specified by one or more rules in the presence rules datastore 120.

In some embodiments, the presence system 100 contains a subscription management component 125 and a publishing component 130 that are coupled to the presence management component 105. The subscription management component 125 and publishing component 130 enable the presence system to use a publisher/subscriber model to provide presence information to other applications or services. That is, the subscription management component enables applications or services to subscribe to the presence system and receive presence updates about one or more users of the system. The publishing component publishes updates to subscribers, either at the request of the subscriber, on a periodic basis, or upon the occurrence of a certain event (e.g., when the status of a user changes). Additional information about presence information in instant messaging system may be found in RFC 2778, entitled "A Model for Presence and Instant Messaging."

In some embodiments, the presence system includes a user status detection component 135 and a relationship engine 140 coupled to the presence management component 105. A user may change their presence state on a manual basis. For example, the user may indicate that they are "away" from their desk or "in a meeting" by manually changing a status associated with an instant messaging application. Alternatively, the user status detection component 135 is intended to judge the current activities of the user in order to predict the presence state of the user. The status detection component accesses a variety of data sources associated with a user in order to predict the presence state. For example, the status detection component may access the user's calendar to determine whether the user is currently in a meeting based on the known date and time. Alternatively, the status detection component may monitor the use of a computer associated with the user to determine if the user is working on a Word document or giving a PowerPoint presentation. If sufficient indicia are detected by the user status detection component 135 to warrant a change in the presence state of the user, the user status detection component automatically modifies the presence state in the presence information datastore 115. Such a modification by the user status detection component can, of course, be overridden by the user if the user disagrees with the predicted state.

The relationship engine component 140 attempts to automatically predict the presence level, or relationship, between the user and a party requesting to communicate with the user. In many cases the user will manually set the presence level for another party or parties. As will be described in additional detail herein, alternatively the relationship engine component 140 accesses a variety of data sources in order to explicitly or implicitly determine the relationship between the user and the requesting party. For example, the relationship engine component may examine the email address of the requesting party to determine whether the second level domain associated with the requesting party is the same second level domain as is associated with the user. If the second level domains are the same, the system relationship engine component may be able to predict that the user and the requesting party work for the same company and therefore a certain presence level should automatically apply in the absence of the user specifying the presence level. When sufficient indicia are detected by the relationship engine component 140 to warrant the creation or change of the presence level associated with a party, the relationship engine component automatically modifies the presences level in the presence information datastore 115. Such a modification by the relationship engine component can, of course, be overridden by the user if the user disagrees with the predicted level.

The computing device on which the presence system 100 is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
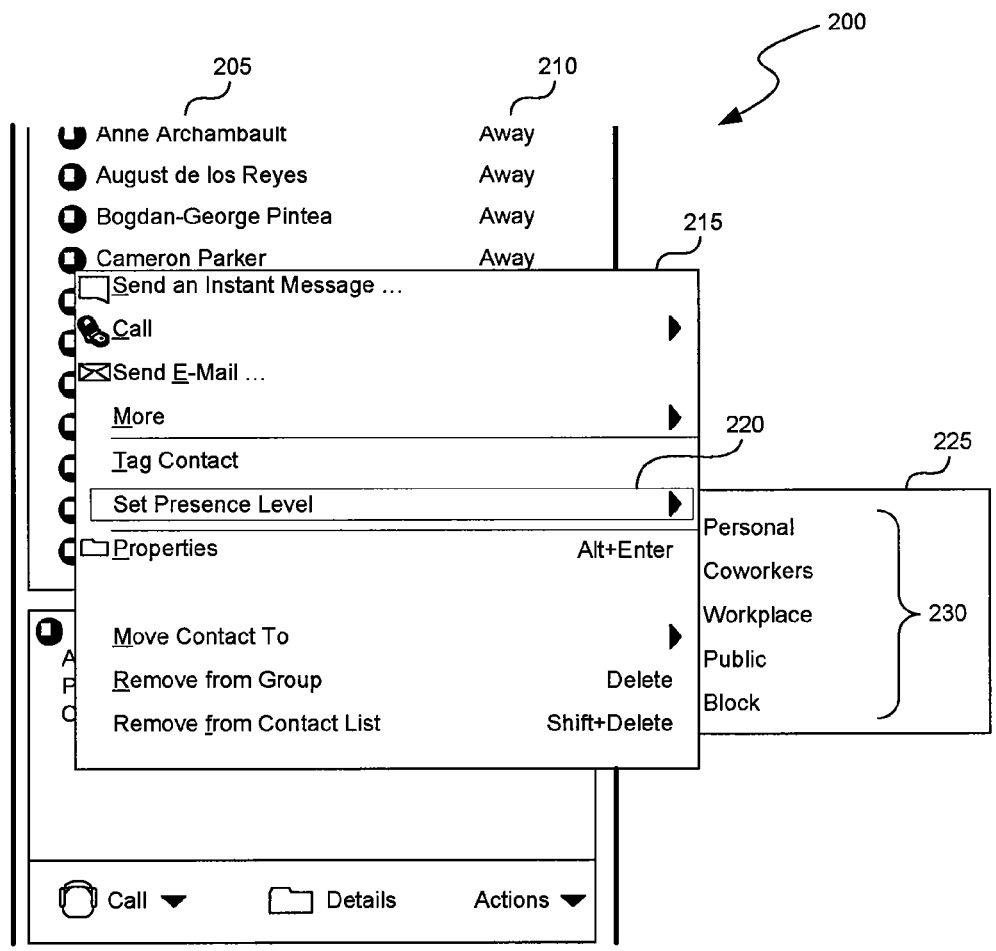
FIG. 2 is a representative user interface that allows a user to specify the presence level of a party.

FIG. 2 is a representative user interface to allow a user to set a presence level of one or more contacts in a contact list 200. The contact list displayed in FIG. 2 is one that might be found in an instant messaging application. The names of various parties 205 are provided in the list, as well as the current presence state 210 of the party. By right-clicking on or otherwise selecting a party in the contact list, the user causes a menu 215 to be displayed with actions that may be taken with respect to the selected party. One of the actions that may be selected by the user is a menu option 220 called "Set Presence Level." Hovering or selecting the menu option 220 causes a flyout menu 225 to appear. The menu contains a number of relationships 230 that may be specified by the user. The relationship levels may include familial relationships (e.g., children, cousins), professional relationships (e.g., group members, management), social network relationships (e.g., friends, friends of my friends), service relationships (e.g., IT group), or other relationships. As depicted in FIG. 2, in some embodiments the relationships that may be specified include "personal," "coworker," "workplace," "public," or "block" (i.e., no relationship). Those skilled in the art will appreciate that the number and titles of the displayed relationships may be greater than or less than the number shown in FIG. 2, which are intended to be merely representative of the type of relationships that might exist. If the user selects one of the relationships in the flyout menu, the selected relationship is associated with the selected party and the relationship stored by the system in the presence information datastore 115. By selecting one of the relationships, the user implicitly characterizes the level of interaction and amount of information exchanged between the user and the party with which they are comfortable.

Figure 3:
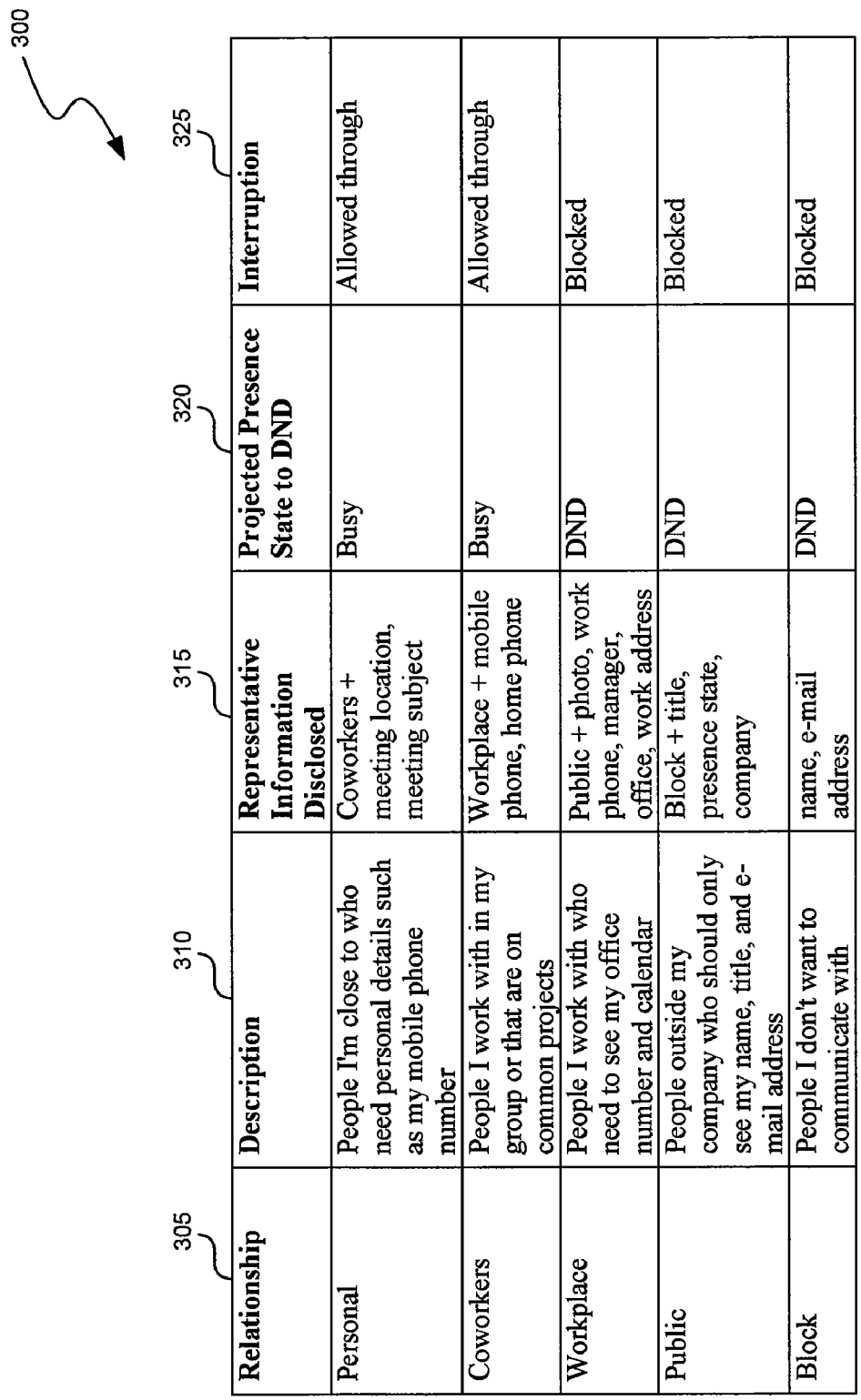
FIG. 3 is a table of relationships that may be selected by a user to indicate a presence level.

FIG. 3 is a table 300 that lists the various presence levels that may be presented to a user and associated with a party or parties. Each row in the table represents one of the presence levels that may be specified by the user. Each column in the table provides information that characterizes the presence level or describes how an incoming communication request is to be managed in the event that the user is not available to receive the communication. The first two columns are attributes that may be used to characterize a presence level. The first column in the table is a relationship attribute 305. As was discussed above, in the depicted embodiment five levels of relationship are defined, ranging from "personal" to "block" (i.e., no relationship). The second column of the table is a description 310 of the presence level. The description is intended to be a plain-English explanation of the presence level that is suitable for display to a user, such as in flyout menu 230. As will be appreciated from the discussion herein, it has been found that the use of relationships to allow users to characterize how communication requests are to be managed is a particularly intuitive technique to users. Users are able to quickly understand each relationship level and to appropriately assign a relationship level to a contact or other party with a minimal amount of instruction or help.

The remaining three columns in the table 300 are presence rules that characterize how an incoming communication request is to be managed in the event that the user is not available to receive the communication. The third column in the table identifies a type of contact information 315 that may be disclosed to the requesting party. At the lowest level, when the presence level is "block" only the name and e-mail address of the user may be disclosed. At the next higher presence level ("public"), all of the information of the "block" level is disclosed with the addition of the user's presence state, title, and company. At the highest presence level ("personal"), all information in previous levels is disclosed in addition to the meeting location and subject where the user may currently be located. It will be appreciated that the types of contact information 315 listed in the chart is merely representative of the type of contact information that may be disclosed, and that a greater or lesser amount of information may be disclosed at every preference level. The fourth column in the table identifies a projected presence state 320 that the requesting party will receive if the user has indicated that his or her presence state is "do not disturb" (DND). Requesting parties assigned to the lowest three relationship levels will receive a "DND" message, wherein requesting parties assigned to the highest two relationship levels will receive a "Busy" message. The fifth column in the table identifies when an interruption 325 may be made to the user. Requesting parties assigned to the lowest three relationship levels will be blocked, whereas requesting parties assigned to the highest two relationship levels will be allowed to interrupt the user. It will be appreciated that the presence rules may be expanded or reduced beyond those shown in FIG. 3. In particular, additional rules may be added in order to define how communication requests will be managed in situations where the user status is other than "DND." Because the presence rules that characterize how incoming communication requests are managed intuitively flow from the relationships used to set presence levels, users very quickly become comfortable with setting presence levels and understanding the results of such settings. Table 300 may be stored by the presence system 100 in the presence rules datastore 120.

Figure 4:
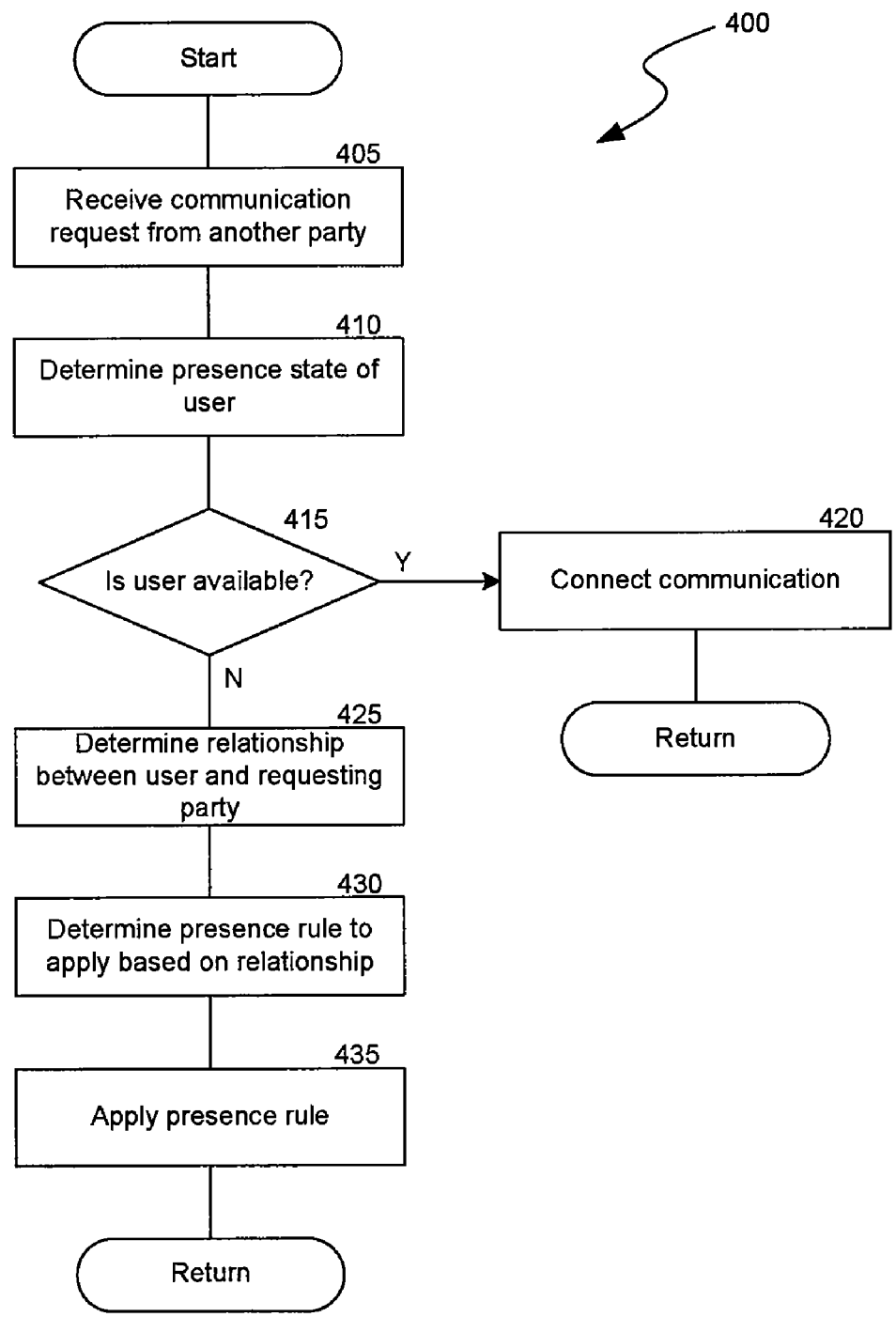
FIG. 4 is a flow chart of a process for handling an incoming communication request to a user.

Once a user has specified presence levels for one or more parties, the presence system will manage all incoming communication requests in accordance with the presence rules that are associated with each presence level. FIG. 4 is a flow diagram of a routine 400 for processing communication requests in accordance with the associated presence rules. At a block 405, a communication request is received from another party. The communication request may be in the form of an instant message, an e-mail, a voice call, or any other communication form. At a block 410, the system determines the presence state of the user. The presence state may have been manually set by the user, or predicted by the user status detection component 135 using a variety of data sources. At a decision block 415, the system tests to see if the user is available for communication. If the user is available for communication, processing continues to a block 420 where the communication request is connected with the user. If the user is not available for communication, such as when the user has set their presence state to "do not disturb" or is otherwise not near their phone, portable device, or computer (e.g., is in a meeting, is on vacation), then processing continues to a block 425.

If the user is not available for communication, at block 425 the system determines whether there is a relationship between the user and the requesting party. Such a relationship between the user and the requesting party may have been previously specified by the user and explicitly stored in the presence information datastore 115. Alternatively, the relationship may be inferred from a number of data sources that are accessed by the relationship engine 140. If no relationship between the user and the requesting party can be determined, a default relationship such as "public" may be applied. At a block 430, the system applies the corresponding presence rules based on the determined relationship and the status of the user (either manually set or inferred by the user status detection component). One or more presence rules may be obtained from the presence rules datastore 120, and may be applied to the communication request. For example, a communication request may be made from a coworker to interrupt a user that has a "do not disturb" status. In accordance with the sample rules depicted in FIG. 3, the communicating party may be able to view representative information such as the mobile phone and home phone of the user, will see a "Busy" presence rather than a "DND" presence, and may have a message conveyed to the user with an option for the user to allow the communication request to be completed.

It will be appreciated that the presence rules depicted in FIG. 3 may be the default rules that are applied by the system in the absence of any modification that is made by the user. An interface (not shown) may be presented to the user so the user may modify the presence rules on a global basis, a group basis, or a party-by-party basis. In this fashion, the user would have greater control over individual communication requests. Providing such flexibility, however, may come at the expense of a simple and intuitive user experience.

It will also be appreciated that various changes could be made to the steps shown in FIG. 4. The order of the steps may be rearranged, steps may be performed in parallel, steps may be omitted, or other steps may be included. For example, block 425 may be moved before decision block 415 so that the system determines whether there is a relationship between the user and the requesting party before determining whether the user is available. The knowledge of the relationship between the requesting party and the user may then be used to determine whether the connection should be made at block 420 or whether the communication should be made in a different fashion.

In addition to applying the presence rules to the communication requests made to a user, a record of the communication requests may be maintained by the system. The record of communication requests may be utilized by the system or by other applications or services in a variety of different ways. For example, a list of previous communication requests may be presented to the user. The list may be sorted by presence level to allow the user to prioritize the order of following-up or otherwise acting on the communication requests.

Figure 5:
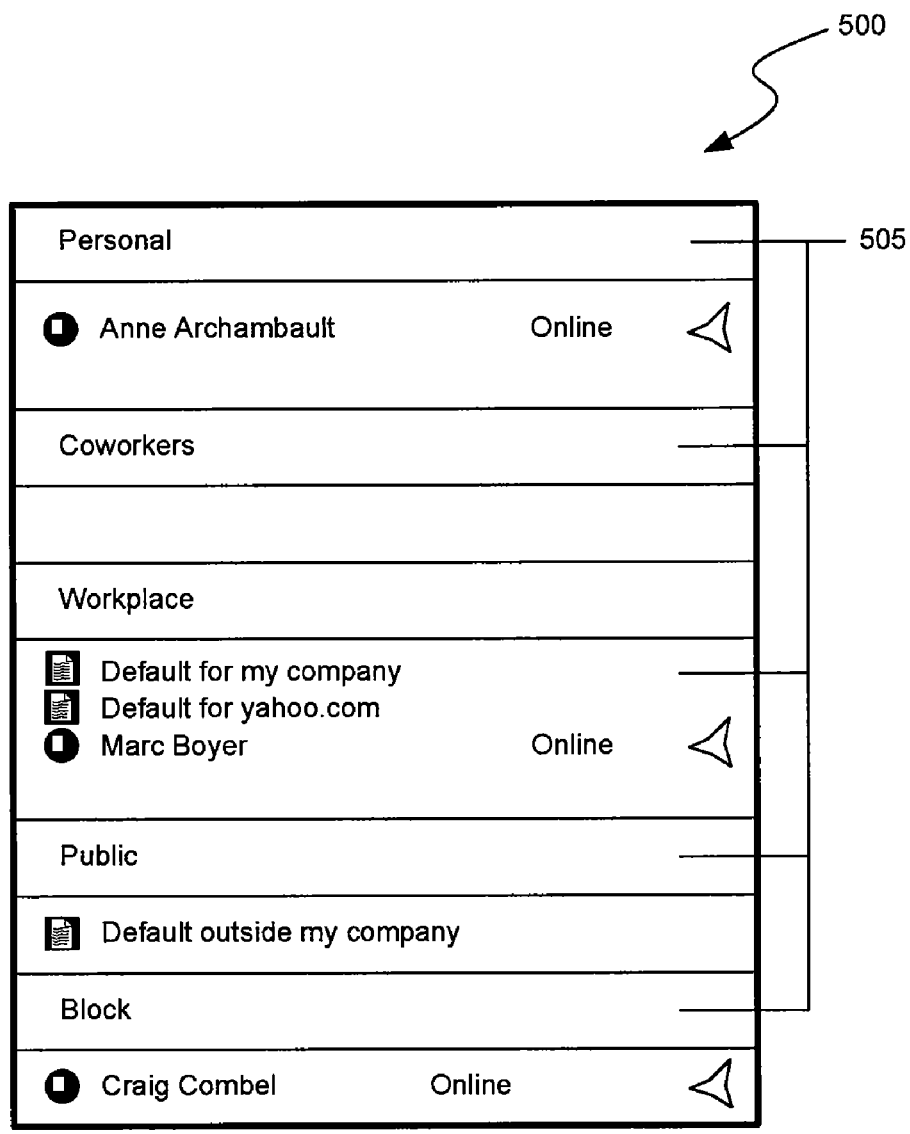
FIG. 5 is a representative user interface that enables a user to view and manipulate presence levels.

Additional interfaces are provided by the presence system 100 to allow a user to manage presence level information. FIG. 5 is a representative user interface 500 that enables a user to specify, view, and manipulate presence levels. The interface is divided into five regions 505, each region corresponding to one of the presence levels. Within each region are those parties that have been specified by a user or identified by the relationship engine as having been assigned to that presence level. For example, one party ("Marc Boyer") and two groups ("default for my company," "default for yahoo.com") may be found under the "Workplace" presence level in user interface 500. By seeing all of the parties separated by presence level, a user may more easily assess whether the correct presence level has been assigned to each party.

The interface 500 allows the user to quickly add or modify the parties associated with each presence level. In order to add a party to a presence level, the user right clicks on the desired presence level. Right-clicking generates a dialog box (not shown) that allows the user to enter the name and contact information (if an individual) or the domain name (if a group) to add the party to the list. By allowing the user to specify a domain name, the user can quickly assign all incoming communications having an email address from the specified domain name to a particular presence level. For example, a user can quickly associate their own workplace with a particular presence level based on a domain name associated with the company's email. In order to change the presence level of displayed parties, the user has a variety of options. The user may drag-and-drop a party from one presence level to another presence level. Alternatively, the user may right click on a party and change the presence level using a flyout menu (not shown), such as the one depicted in FIG. 2. Other techniques to modify the presence level, are, of course, possible. Additionally, the presence system may have default presence levels assigned to certain parties, such as the setting of a "public" level for any communications that are "outside my company" depicted in FIG. 5.

Figure 6:
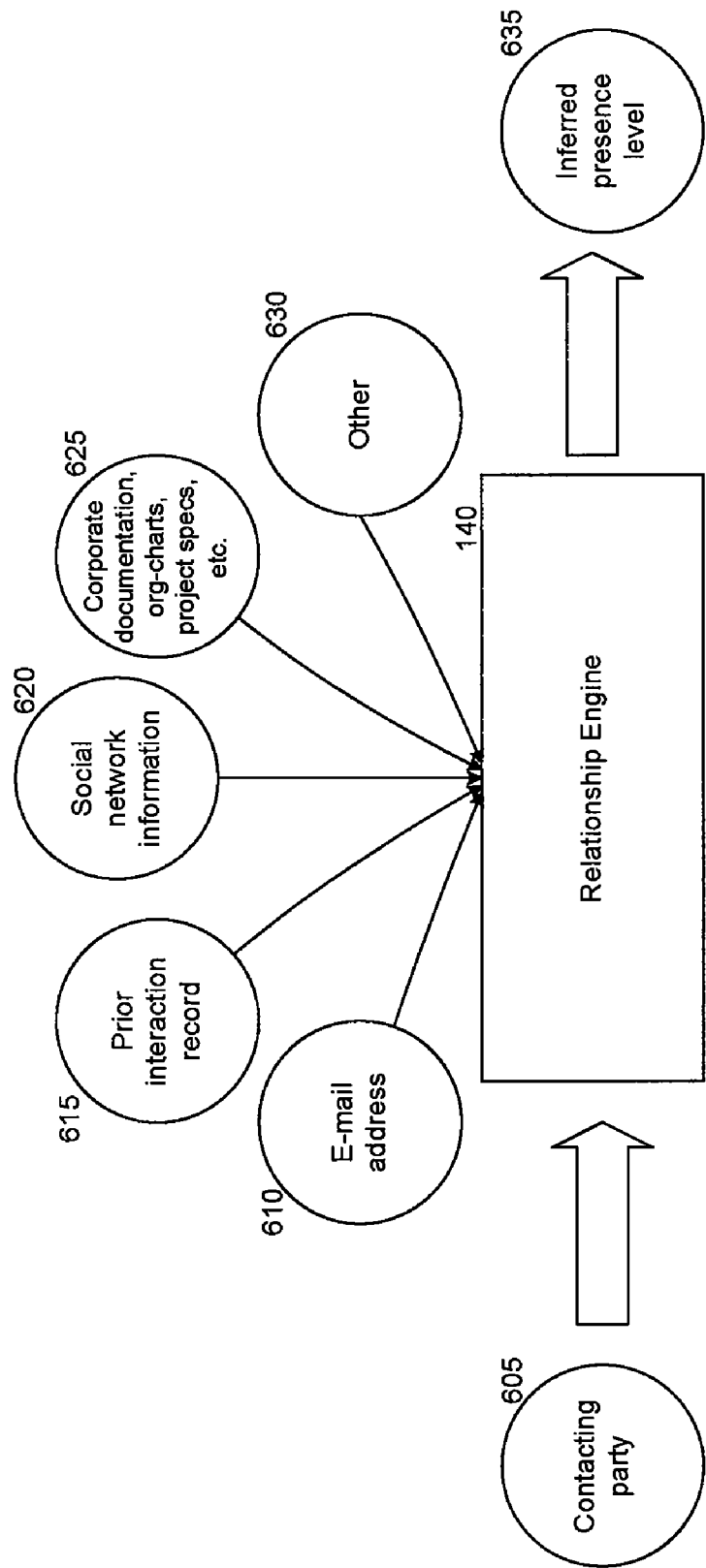
FIG. 6 is a block diagram that conceptually illustrates the operation of a relationship engine in the presence system.

FIG. 6 is a block diagram that conceptually illustrates the operation of the relationship engine 140. A party 605 that is currently contacting the user or may be contacting the user in the future (e.g., is in the user's contact list) is input into the relationship engine 140. The relationship engine draws on many different sources of information to infer the relationship between the contacting party and the user. Sources of information may include, but not be limited to:

An e-mail address 610 of the party may provide an indication of a relationship between the party and the user. E-mail addresses that are from the same company as the user may signify a co-worker, while e-mail addresses containing the same surname as the user (e.g., bob.smith@hotmail.com) may signify the same family as the user.

A record of prior interactions 615 with the contacting party may be used by the relationship engine to ascertain a relationship. For example, if the user typically quickly responds to communications from the contacting party, then it may be inferred that the contacting party has a close relationship or a least a relationship that demands a high priority. In contrast, if the user typically fails to respond to communications from the connecting party, then in may be inferred that the user has little or no relationship with the party.

Information on a social network 620 of the user may be used by the relationship engine to ascertain a relationship. The relationship engine may interface with a social networking service in order to determine how many degrees the contacting party is removed from the user. For example, close connections to parties that are identified as family in a user's social network may be characterized as a more important relationship than parties that are distantly connected via a friend of the user.

Information in corporate documentation 625, such as organization charts, project specifications, meeting invitations, or other records that may indicate a relationship between the user and other parties. For example, an organization chart may be used by the relationship engine to quickly distinguish those parties that are senior to a user in an organization from those parties that are junior to a user in an organization. Moreover, a standing meeting with a regular list of invitees may identify parties that should be identified as "coworkers" by the relationship engine.

Any other information 630 that allow the relationship engine to infer a relationship between the user and other parties may also be utilized, including any preferences that the user may have set with respect to certain users or groups of users.

The relationship engine 140 uses the various sources of information that are available to it and attempts to infer a relationship between a user and a contacting party. A probability level may be assigned to the inferred relationship, and the relationship may not be used by the system until the probability level exceeds a desired threshold. Once the relationship engine has completed its analysis, an inferred presence level 635 between the user and the contacting party is output by the relationship engine and stored in presence information datastore 115. A user may subsequently override the relationship if the inference proves not to be accurate.

While various embodiments are described in terms of the environment described above, those skilled in the art will appreciate that various changes to the system may be made without departing from the scope of the invention. For example, the actual implementation of datastores 110, 115, and 120 may take a variety of forms, and the term "datastore" is used herein in the generic sense to refer to any data structure that allows data to be stored and accessed, such as tables, linked lists, arrays, etc. As another example, the steps shown in FIG. 4 may be altered in a variety of ways. The order of the steps may be rearranged, substeps may be performed in parallel, steps may be omitted, or other steps may be included. As a further example, while FIG. 3 depicts a table whose contents and organization are designed to make it more comprehensible to the human reader, those skilled in the art will appreciate that the actual data structure used by the facility to store this information may differ from the table shown. For example, the table may be organized in a different manner, may contain more or less information than shown, may be compressed and/or encrypted, and may otherwise be optimized in a variety of ways.

From the foregoing, it will be appreciated that specific embodiments of the extensible presence system have been described herein for purposes of illustration, but that various modifications may be made without deviating from the spirit and scope of the invention. Accordingly, the invention is not limited except as by the appended claims.

We claim:

1. A method of managing communication requests to a user on the basis of a relationship level between the user and a party requesting to communicate with the user, the method comprising:
    maintaining a plurality of relationship levels, each of the plurality of relationship levels having one or more associated presence rules that dictate the management of a communication request between two parties that are associated by the respective relationship level;
    storing an indication of a relationship level between the user and each of a plurality of other parties; and
    upon receipt of a request from a party to communicate with the user, determining if the user has a stored relationship level with the requesting party and:
        if the user has a stored relationship level with the requesting party, applying the one or more presence rules associated with the stored relationship level in order to manage the communication request; and
        if the user does not have a stored relationship level with the requesting party, inferring a relationship level between the user and the requesting party and applying the one or more presence rules associated with the inferred relationship level in order to manage the communication request.

2. The method of claim 1, wherein the relationship level may be a familial relationship, a professional relationship, or a social relationship.

3. The method of claim 1, wherein the relationship level is inferred based on an e-mail address associated with the requesting party.

4. The method of claim 1, wherein the requesting party is a group.

5. The method of claim 1, wherein the one or more presence rules includes a rule that determines a type of presence information pertaining to the user that the requesting party is allowed to receive.

6. The method of claim 1, wherein the relationship level is inferred based on an analysis of a social network between the user and the requesting party.

7. The method of claim 1, wherein the relationship level is inferred based on an analysis of corporate documentation.

8. The method of claim 1, wherein the relationship level is inferred based on an analysis of a prior interaction with the requesting party.

9. A computer-readable storage medium containing instructions for managing communication requests to a user in a computer system on the basis of a relationship level between the user and a party requesting to communicate with the user by:
    storing a plurality of relationship levels, each of the plurality of relationship levels having one or more associated presence rules that dictate the management of a communication request between two parties that are associated by the relationship level;
    storing an indication of a relationship level between a user and each of a plurality of other parties; and
    upon receipt of a request from a party to communicate with the user:
        determining whether there is a stored relationship level associated with the requesting party;
        if there is a stored relationship level associated with the requesting party, applying the one or more presence rules associated with the stored relationship level in order to manage the communication request; and
        if there is not a stored relationship level associated with the requesting party, inferring a relationship level and applying the one or more presence rules associated with the inferred relationship level in order to manage the communication request.

10. The computer-readable storage medium of claim 9, wherein the relationship level may be a familial relationship, a professional relationship, or a social relationship.

11. The computer-readable storage medium of claim 9, wherein the relationship level is inferred based on an e-mail address associated with the requesting party.

12. The computer-readable storage medium of claim 9, wherein the requesting party is a group.

13. The computer-readable storage medium of claim 9, wherein the one or more presence rules includes a rule that determines a type of presence information pertaining to the user that the requesting party is allowed to receive.

14. The computer-readable storage medium of claim 9, wherein the relationship level is inferred based on an analysis of a social network between the user and the requesting party.

15. The computer-readable storage medium of claim 9, wherein the relationship level is inferred based on an analysis of corporate documentation.

16. The computer-readable storage medium of claim 9, wherein the relationship level is inferred based on an analysis of a prior interaction with the requesting party.

17. A system for managing communication requests to a user on the basis of a relationship level between the user and a party requesting to communicate with the user, the system comprising:
    a storage component for storing:
        a plurality of relationship levels, each of the plurality of relationship levels having one or more associated rules that dictate the management of a communication request between two parties that are associated by the respective relationship level; and a specified relationship level between a user and each of a plurality of other parties; and a presence management component coupled to the storage component that, upon receipt of a request from a party to communicate with the user, determines whether there is a stored relationship level associated with the party and, if there is a stored relationship level, applies the one or more rules associated with the stored relationship level in order to manage the communication request with the user, or, if there is no stored relationship level, infers a relationship level with the party and applies the one or more rules associated with the inferred relationship level in order to manage the communication request with the user.

18. The system of claim 17, wherein a relationship level may be a familial relationship, a professional relationship, or a social relationship.

19. The system of claim 17, wherein the one or more rules includes a rule that determines a type of presence information pertaining to the user that the other party is allowed to receive.

* * * * *

UNITED STATES PATENT AND TRADEMARK OFFICE
CERTIFICATE OF CORRECTION

PATENT NO. : 7,483,969 B2  
APPLICATION NO. : 11/539848  
DATED : January 27, 2009  
INVENTOR(S) : Ankur Chavda et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by (127) days Delete the phrase "by 127 days" and insert -- by 42 days --

Signed and Sealed this

Third Day of November, 2009

David J. Kappos  
*Director of the United States Patent and Trademark Office*